United States Patent
Chen (10) Patent No.: US 10,493,955 B1
(45) Date of Patent: Dec. 3, 2019

(54) INTERNET OF VEHICLES SYSTEM PERFORMING CONNECTION AUTHENTICATION THROUGH A PUBLIC NETWORK AND CONNECTION METHOD

(71) Applicant: IVTES LTD., New Taipei (TW)

(72) Inventor: Chi-Ting Chen, New Taipei (TW)

(73) Assignee: IVTES LTD., New Taipei (TW)

( * ) Notice: Subject to any disclaimer, the term of this patent is extended or adjusted under 35 U.S.C. 154(b) by 0 days.

(21) Appl. No.: 16/059,844

(22) Filed: Aug. 9, 2018

(30) Foreign Application Priority Data

Jun. 14, 2018 (TW) .............................. 107120476 A (51) Int. Cl.
| | |
|---|---|
| *B60R 25/24* | (2013.01) |
| *G07C 9/00* | (2006.01) |
| *H04W 4/40* | (2018.01) |
| *G07C 5/00* | (2006.01) |
| *H04W 4/80* | (2018.01) |

(52) U.S. Cl.
CPC ............. *B60R 25/241* (2013.01); *G07C 5/008* (2013.01); *G07C 9/00309* (2013.01); *H04W 4/40* (2018.02); *H04W 4/80* (2018.02); *B60R 2325/101* (2013.01); *B60R 2325/205* (2013.01); *G07C 2009/00412* (2013.01)

(58) Field of Classification Search
CPC ........ G06F 21/00; G06F 21/43; H04W 12/08; H04W 12/06; H04L 29/06
USPC ...................... 340/5.72; 455/414.2, 410, 420
See application file for complete search history.

(56) References Cited

U.S. PATENT DOCUMENTS

| | | | | |
|---|---|---|---|---|
| 7,181,620 B1* | 2/2007 | Hur | ......................... | H04L 9/083 713/168 |
| 7,912,512 B2* | 3/2011 | Odinak | ............... | H04M 1/6075 455/569.2 |
| 8,918,643 B2* | 12/2014 | Okude | .................... | B60R 25/24 713/168 |
| 9,032,493 B2* | 5/2015 | Lortz | .................... | H04L 63/104 726/7 |
| 9,248,807 B2* | 2/2016 | Lee | ..................... | B60R 25/2018 |
| 9,516,024 B2* | 12/2016 | Kirsch | ................ | H04L 63/0876 |
| 2009/0006864 A1 | 1/2009 | Hashimoto et al. | | |
| 2010/0241857 A1 | 9/2010 | Okude et al. | | |

(Continued)

FOREIGN PATENT DOCUMENTS

JP 2007108973 A 4/2007

*Primary Examiner* — Nam V Nguyen
(74) *Attorney, Agent, or Firm* — Rabin & Berdo, P.C.

(57) ABSTRACT

An Internet of Vehicles system performing connection authentication through a public network and a connection method using the same are disclosed. A mobile device transmits an authentication code to a remote cloud server to complete an online identity authentication, searches a local vehicular computer through a Bluetooth connection after completion of the online identity authentication, exchanges information with the vehicular computer, authenticates the exchanged information, and establishes connection with the vehicular computer after completion of the authentication. For control over the vehicular computer of a vehicle through the mobile device, the online identity authentication must be completed before data exchange and established secure connection, thereby effectively enhancing effectiveness of connection security and lowering the risk of vehicle theft.

5 Claims, 8 Drawing Sheets

(56) References Cited

U.S. PATENT DOCUMENTS

| | | | | |
|---|---|---|---|---|
| 2011/0112969 A1* | 5/2011 | Zaid | ............... | G06Q 10/02 |
| | | | | 705/50 |
| 2012/0173128 A1* | 7/2012 | Peeler | ............... | G06Q 10/06 |
| | | | | 701/113 |
| 2012/0254960 A1 | 10/2012 | Lortz et al. | | |
| 2013/0281017 A1* | 10/2013 | Bondesen | ............... | H04W 4/21 |
| | | | | 455/41.1 |
| 2014/0031010 A1* | 1/2014 | Wuergler | ............... | H04W 76/10 |
| | | | | 455/411 |
| 2014/0328248 A1* | 11/2014 | Greubel | ............... | H04W 8/005 |
| | | | | 370/328 |
| 2015/0024686 A1* | 1/2015 | Hrabak | ............... | H04W 12/06 |
| | | | | 455/41.2 |
| 2015/0024688 A1* | 1/2015 | Hrabak | ............... | H04W 12/06 |
| | | | | 455/41.2 |
| 2017/0055108 A1 | 2/2017 | Jeon | | |

* cited by examiner

INTERNET OF VEHICLES SYSTEM PERFORMING CONNECTION AUTHENTICATION THROUGH A PUBLIC NETWORK AND CONNECTION METHOD

BACKGROUND OF THE INVENTION

1. Field of the Invention

The present invention relates to an Internet of Vehicles (IoV) system and, more particularly, to an IoV system performing connection authentication through a public network and a connection method.

2. Description of the Related Art

Owing to rapid information technology development driving other industrial chains to undergo a transformation process, given the automotive industry as an example, to enhance driving comfort, maneuverability, safety and the like of drivers, vehicle manufacturers in succession equip vehicles with many intelligent driving assistance systems.

To wirelessly control a vehicle, currently, users may employ mobile devices to establish connection with a vehicular computer of the vehicle through a Bluetooth connection, such that the mobile devices can control the vehicle door to be locked or unlocked or the vehicular computer to issue an alarm. However, mobile devices just need to build up their connection with the vehicular computer for the first time to be directly connected to the vehicular computer later on. Supposing that a mobile device has no protection against insecure connection in operation, when the mobile device is lost, anyone who finds the mobile phone can establish connection with the vehicular computer to control the vehicle, making prevention of vehicle theft uneasy.

SUMMARY OF THE INVENTION

An objective of the present invention is to provide an Internet of Vehicles (IoV) system performing connection authentication through a public network and a connection method, which are implemented for secure connection with a vehicular computer after an online identity authentication and a data exchange identity authentication simultaneously performed by a mobile device to enhance connection security between the mobile device and the vehicular computer.

To achieve the foregoing objective, the IoV system includes a cloud server, a vehicular computer and a mobile device.

The cloud server is located at a remote end and stores and compares data.

The vehicular computer is located at a local end, is installed in a vehicle to control various types of electronic equipment of the vehicle, and has a first broadcast name and a first Bluetooth key pre-stored therein.

The mobile device is connected to the cloud server and the vehicular computer and has a second broadcast name and a second Bluetooth key.

The mobile device acquires an authentication code and transmits the authentication code to the cloud server to complete an online identity authentication, searches the vehicular computer according to a Bluetooth protocol, transmits the second broadcast name and the second Bluetooth key to the vehicular computer in exchange of the first broadcast name and the first Bluetooth key in the vehicular computer transmitted from the vehicular computer, and after the vehicular computer successfully authenticates the exchanged second broadcast name and the exchanged second Bluetooth key with the first broadcast name and the first Bluetooth key transmitted from the mobile device, establishes connection with the vehicular computer.

As can be seen from the foregoing system, after completing the online identity authentication with the cloud server, the mobile device searches the vehicular computer through the Bluetooth connection, and establishes connection with the vehicular computer after completion of data exchange and information authentication, so as to enhance connection security and lower vehicle theft.

To achieve the foregoing objective, the connection method performing connection authentication through a public network is performed by an Internet of vehicles (IoV) system with a mobile device connected to a cloud server at a remote end and a vehicular computer at a local end and the connection method comprises steps of:

acquiring an authentication code through the mobile device;

transmitting the authentication code to the cloud server through the mobile device to complete an online identity authentication;

searching the vehicular computer, exchanging information with the vehicular computer, and authenticating the exchanged information through the mobile device; and establishing connection with the vehicular computer through the mobile device.

From the foregoing connection method, after completing the online identity authentication with the cloud server, the mobile device searches the vehicular computer through the Bluetooth connection, and establishes connection with the vehicular computer after completion of authentication of exchanged data, so as to enhance connection security and lower risk of vehicle theft.

Other objectives, advantages and novel features of the invention will become more apparent from the following detailed description when taken in conjunction with the accompanying drawings.

DETAILED DESCRIPTION OF THE INVENTION

Figure 1:
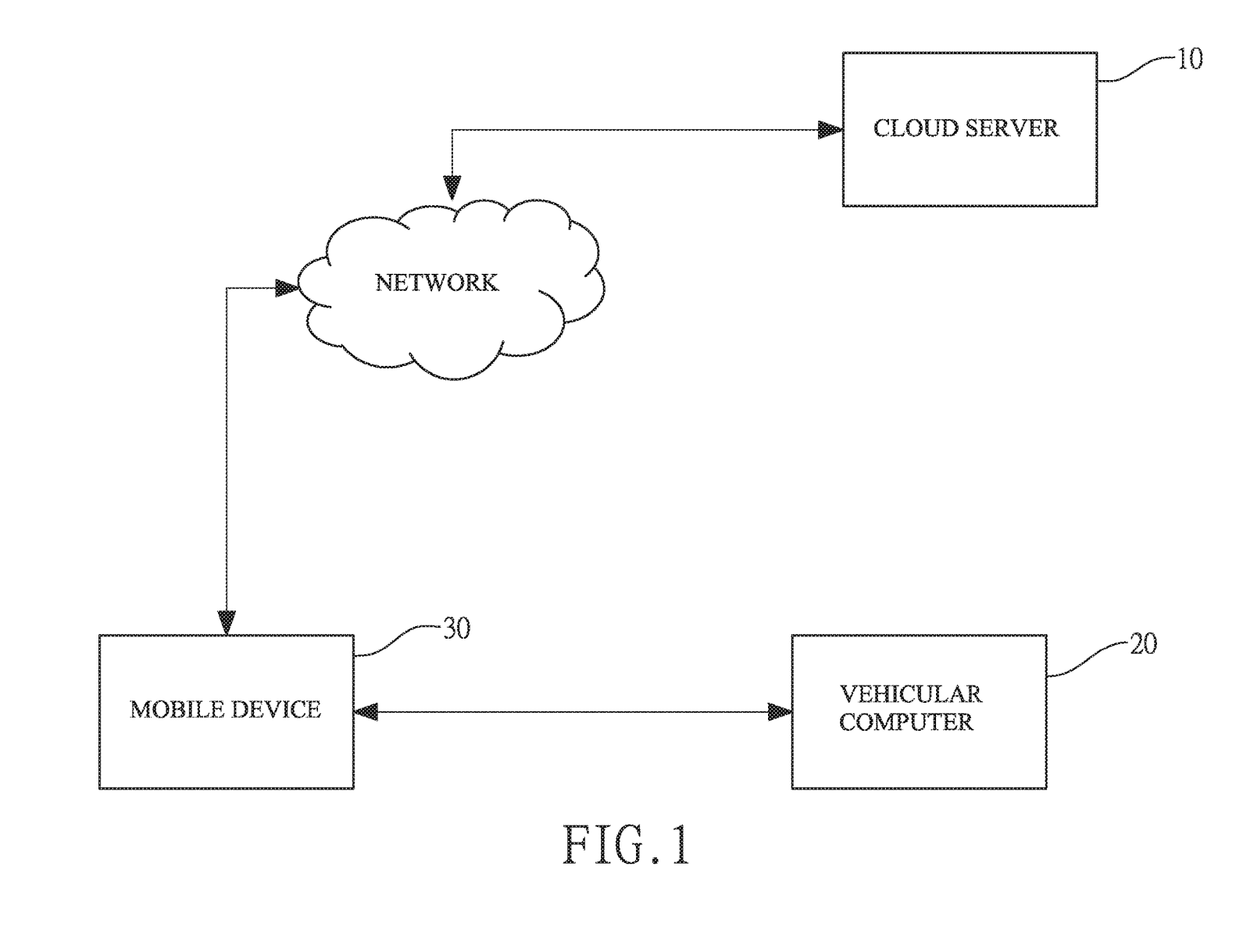
FIG. 1 is a first functional block diagram showing a system architecture of an IoV system performing connection authentication through a public network in accordance with the present invention.

With reference to FIG. 1, an IoV (Internet of Vehicles) system performing connection authentication through a public network in accordance with the present invention includes a cloud server 10 at a remote end, a vehicular computer 20 at a local end, and a mobile device 30. The mobile device 30 is connected to the cloud server 10 and the vehicular computer 20. The vehicular computer 20 is installed in a vehicle to control various types of electronic equipment of the vehicle. The mobile device 30 may be a smart phone, a tablet personal computer, or a wearable smart device.

Figure 2:
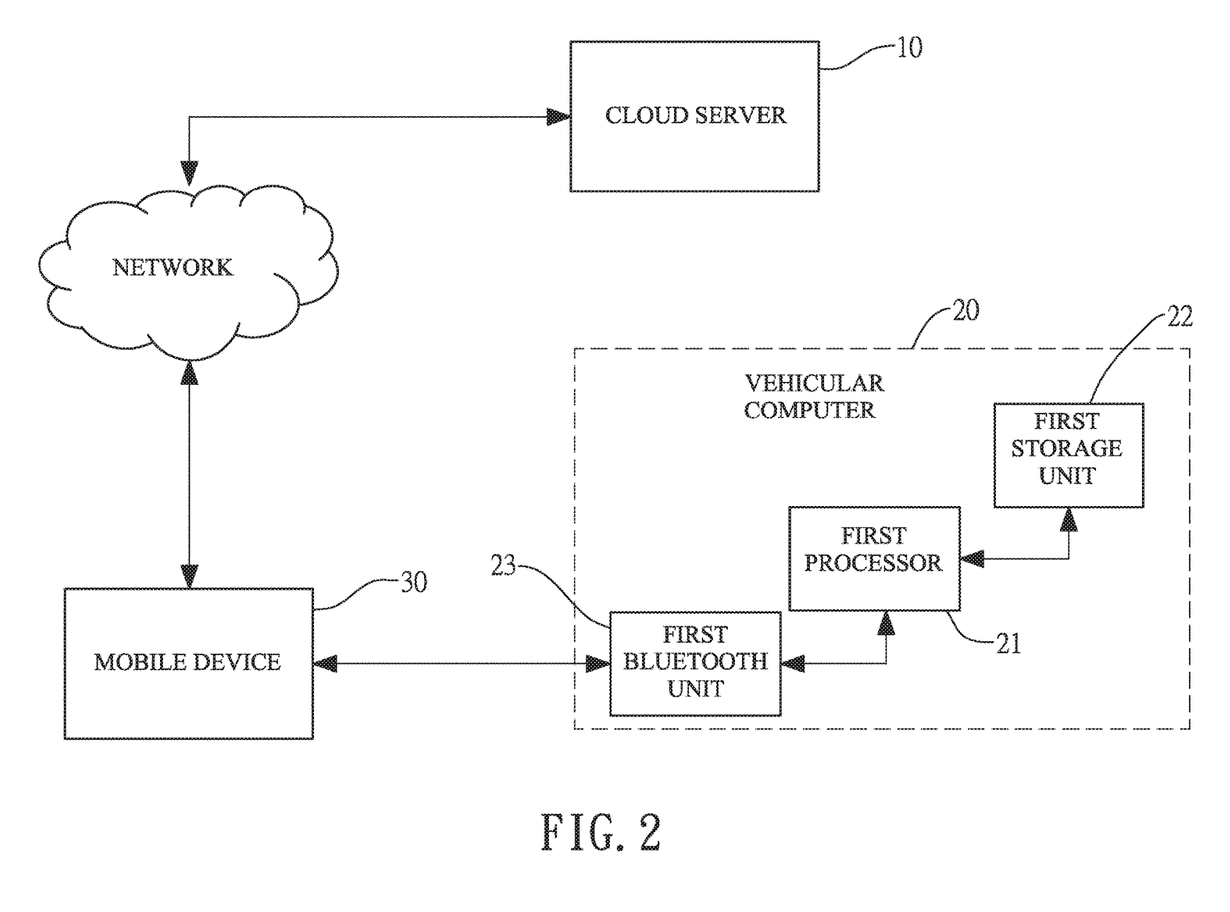
FIG. 2 is a second functional block diagram showing a system architecture of an IoV system performing connection authentication through a public network in accordance with the present invention.
Figure 3:
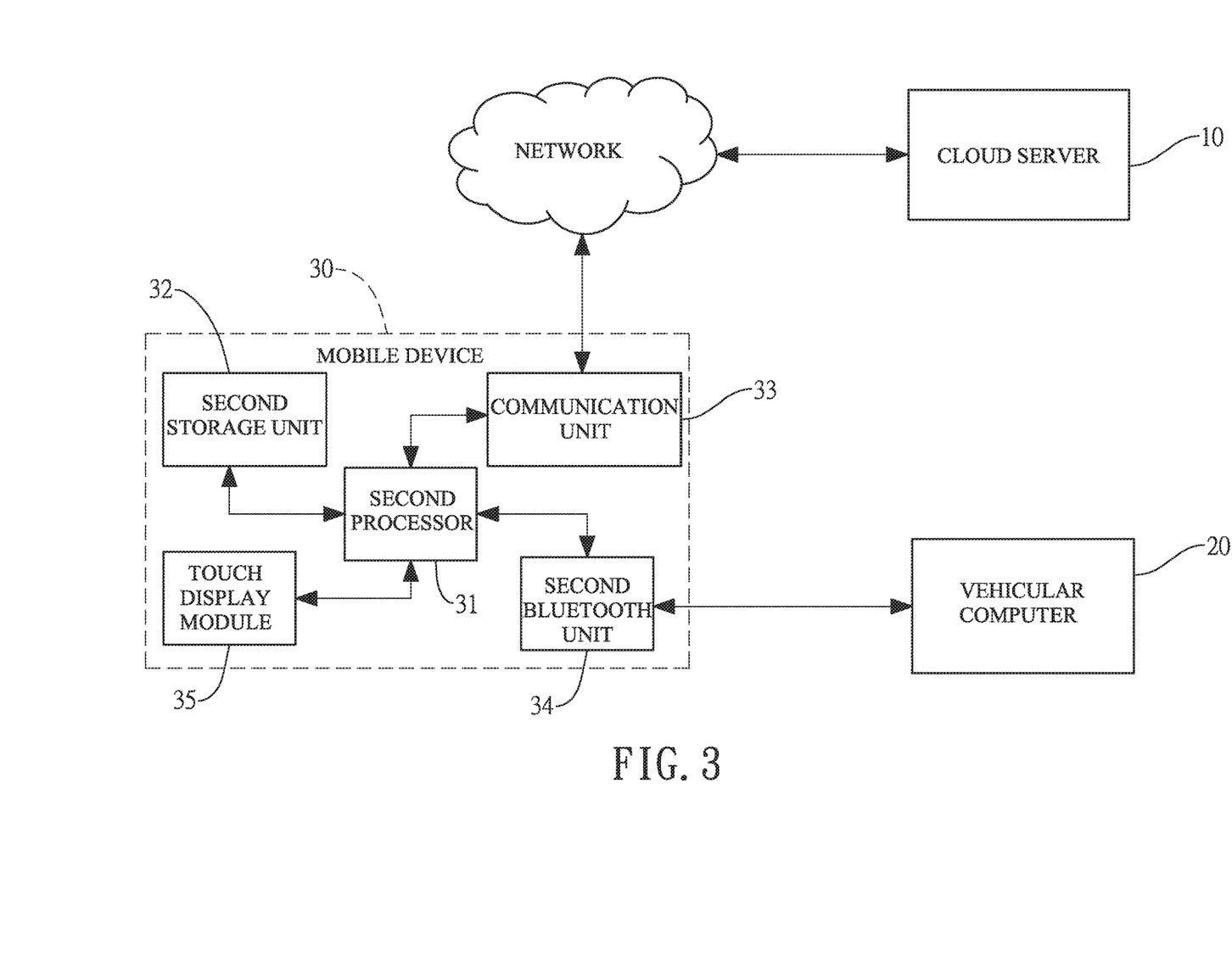
FIG. 3 is a third functional block diagram showing a system architecture of an IoV system performing connection authentication through a public network in accordance with the present invention.

With reference to FIGS. 2 and 3, the vehicular computer 20 includes a first processor 21, a first storage unit 22 and a first Bluetooth unit 23. The first processor 21 is connected to the first storage unit 22 and the first Bluetooth unit 23 and processes received data. The first storage unit 22 serves to store data. The first Bluetooth unit 23 serves to connect the mobile device 30 and transmit and receive data to and from the mobile device 30.

The first storage unit 22 has a first broadcast name and a first Bluetooth key pre-stored therein. The way of pre-storing is explained later. The first Bluetooth unit 23 complies with a Bluetooth protocol, which may be Bluetooth 1.0, Bluetooth 2.0, Bluetooth 3.0, Bluetooth 4.0, Bluetooth 5.0 or a newer Bluetooth protocol.

The mobile device 30 includes a second processor 31, a second storage unit 32, a communication unit 33, a second Bluetooth unit 34 and a touch display module 35. The second processor 31 is connected to the second storage unit 32, the communication unit 33, the second Bluetooth unit 34 and the touch display module 35 and processes received data. The second storage unit 32 serves to store data. The communication unit 33 is connected to the cloud server 10 through a network to transmit and receive data from the cloud server 10. The second Bluetooth unit 34 serves to connect the first Bluetooth unit 23 of the vehicular computer 20 and transmit and receive data to and from the vehicular computer 20. The touch display module 35 serves to input data, and transmits the inputted data to the second processor 31 for processing or display information under the control of the second processor 31. The touch display module 35 may be a touch screen.

The mobile device 30 has an application installed therein for users to operate the application through the touch display module 35 so as to transmit and receive data to and from and authenticate data through or establish connection with the cloud server 10 and the vehicular computer 20.

The second storage unit 32 has a second broadcast name and a second Bluetooth key pre-stored therein. The way of pre-storing is explained later. The second Bluetooth unit 34 complies with a Bluetooth protocol, which may be Bluetooth 1.0, Bluetooth 2.0, Bluetooth 3.0, Bluetooth 4.0, Bluetooth 5.0 or a newer Bluetooth protocol.

A security data mapping table, which includes multiple pieces of security data differing from each other, is pre-stored in the cloud server 10. Each piece of security data has a first broadcast name, a first Bluetooth key, a second broadcast name, a second Bluetooth key, identity information, and an authentication code. What is worth mentioning is that the first broadcast name and the second broadcast name may be the same, and the first Bluetooth key and the second Bluetooth key are symmetric keys or asymmetric keys, such as Hash, AES, RSA, PKCS, or other more reliable authentication schemes.

Figure 4:
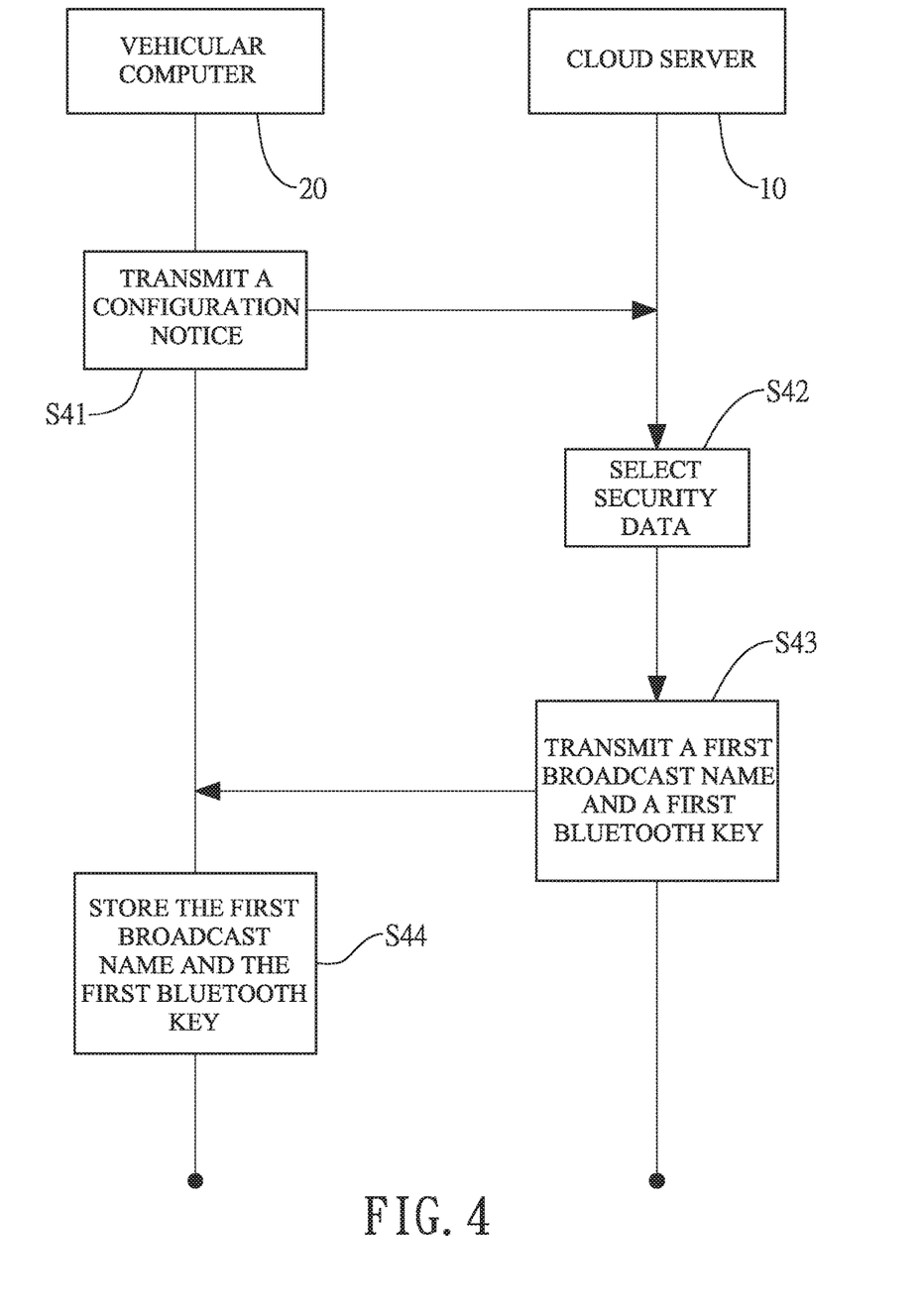
FIG. 4 is a flow diagram showing that a vehicular computer of the IoV system in FIGS. 1, 2 and 3 acquires a first Bluetooth key and a first broadcast name.

Regarding the way of pre-storing the first broadcast name and the first Bluetooth key in the vehicular computer 20, with reference to FIG. 4, when a manufacturer of the vehicular computer 20 intends to configure the vehicular computer 20, the vehicular computer 20 can be connected to the cloud server 10 in a wired or wireless manner and the IoV system performs the following steps.

Step S41: The vehicular computer transmits a configuration notice to the cloud server 10.

Step S42: The cloud server selects one piece of the multiple pieces of security data in the security data mapping table when the receiving the configuration notice.

Step S43: The cloud server 10 transmits the first broadcast name and the first Bluetooth key in the selected piece of security data to the vehicular computer 20.

Step S44: The vehicular computer 20 stores the first broadcast name and the first Bluetooth key. In the present embodiment, the name of the vehicular computer is set up to be the same as the first broadcast name.

Figure 5:
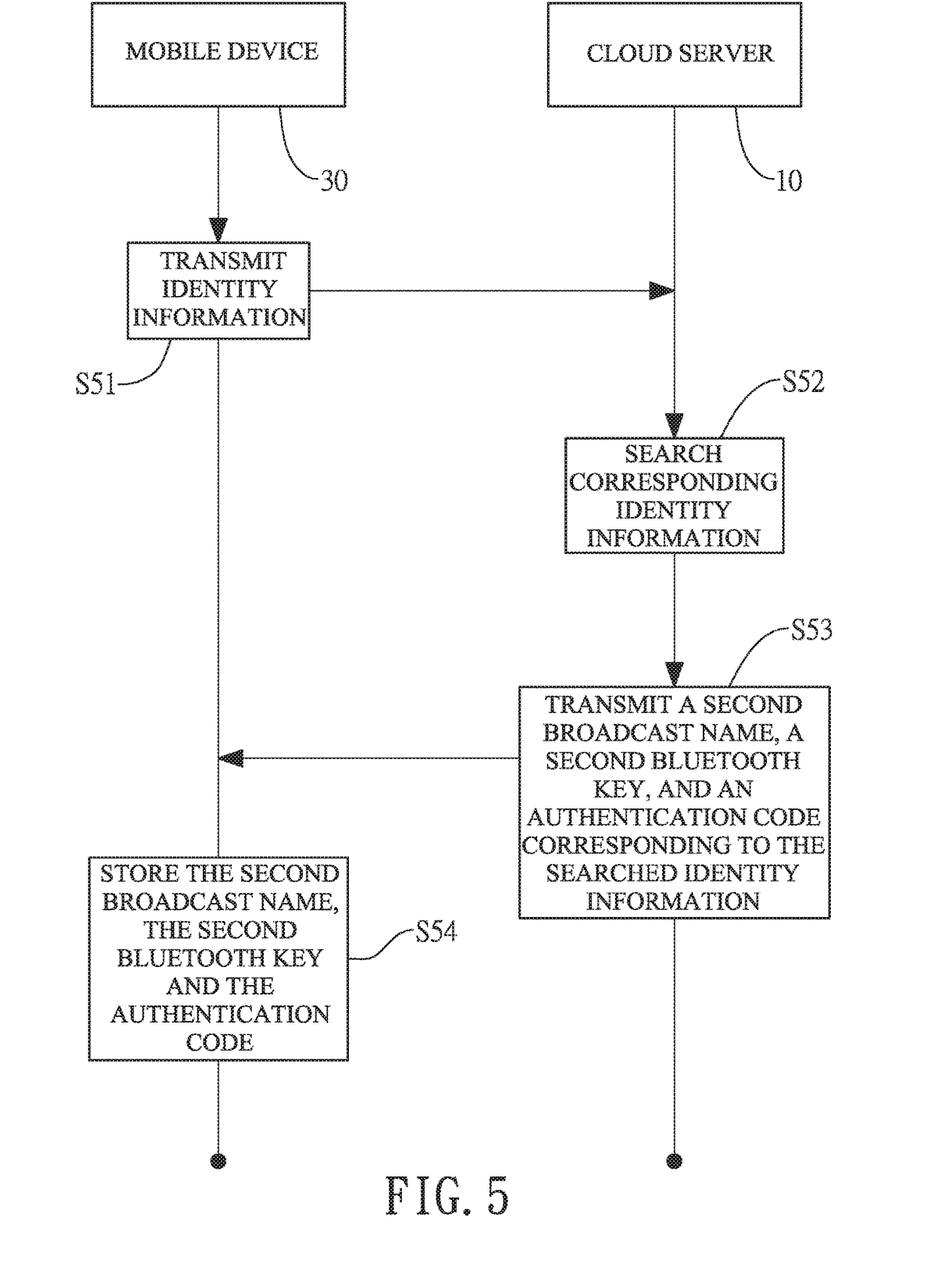
FIG. 5 is a flow diagram showing that a mobile device of the IoV system in FIGS. 1, 2 and 3 acquires a second Bluetooth key and a second broadcast name.

Regarding the way of pre-storing the second broadcast name and the second Bluetooth key in the mobile device 30, with reference to FIG. 5, when purchasing the vehicular computer 20, a user will receive a card pairing with the vehicular computer 20. The card has identity information of the vehicular computer 20 recorded therein. When the second processor 31 of the mobile device 30 receives the identity information inputted by the user through the touch display module 35, the IoV system performs the following steps.

Step S51: The mobile device 30 transmits the identity information to the cloud server 10 through the communication unit 33.

Step S52: When receiving the identity information, the cloud server 10 searches if any of the multiple pieces of security data contains the identity information therein identical to the received identity information.

Step S53: When the identical identity information in any of the multiple pieces of security data is found, the cloud server 10 transmits the second Bluetooth key, the second broadcast name and the authentication code to the communication unit 33 of the mobile device 30.

Step S54: The second processor 31 receives and stores the second Bluetooth key and the second broadcast name in the second storage unit 32, and displays the received authentication code on the touch display module 35. In the present embodiment, the identity information includes a user's ID (identification) and a user's password.

The vehicle can be controlled by the mobile device 30 only after the mobile device 30 establishes connection with the vehicular computer 20. The way of establishing connection between the mobile device 30 and the vehicular computer 20 is elaborated as follows. A user operates the touch display module 35 to control the second processor 31 to execute the application in the mobile device 30 and input the authentication code acquired from the cloud server 10. When receiving the authentication code, the second processor 31 transmits the authentication code to the cloud server 10 through the communication unit 33. When receiving the authentication code, the cloud server 10 performs an online identity authentication. When the online identity authentication is completed, the cloud server 10 transmits an identity authentication completion notice to the communication unit 33, and the second processor 31 instructs the touch display module 35 to display the identity authentication completion notice. Otherwise, the cloud server 10 transmits an identity authentication error notice to the communication unit 33, and the second processor 31 instructs the touch display module 35 to display the identity authentication error notice. In the present embodiment, the online identity authentication means that the cloud server 10 identifies if the authentication code in any of the multiple pieces of security data is identical to the received authentication code, when both authentication codes are identical, the online identity authentication is completed, and otherwise, the online identity authentication is incomplete.

By completing the online identity authentication, the application can then control the mobile device 30 to connect with the vehicular computer 20, thus preventing unauthorized persons from accessing the vehicle and attaining a first protection scheme for secure connection.

After completion of the online identity authentication, a user can then perform the application, the mobile device 30 searches the vehicular computer 20 to exchange information with the vehicular computer 20 and establishes connection with the vehicular computer after authentication of the exchanged information. The way of exchanging and authenticating information includes the following two parts.

Firstly, the user can operate the application through the touch display module 35, allowing the second processor 31 to control the second Bluetooth unit 34 of the mobile device 30 in search of the first broadcast name broadcasted by the first Bluetooth unit 23 of the vehicular computer 20. When the first broadcast name is found, the second processor 31 receives the first broadcast name through the second Bluetooth unit 34 and compares whether the received first broadcast name is identical to the second broadcast name stored in the second storage unit 32 or not. When the first broadcast name and the second broadcast name are compared to be the same, the second processor 31 controls the touch display module 35 to display a broadcast authentication completion notice for user's awareness. In the present embodiment, when both first broadcast names are compared not to be the same, a broadcast authentication error notice is displayed for user's awareness.

Secondly, the second processor 31 transmits the second Bluetooth key to the first Bluetooth unit 23 of the vehicular computer 20 through the second Bluetooth unit 34. The first processor 21 authenticates the received second Bluetooth key with the first Bluetooth key stored in the first storage unit 22. When the authentication is successful, the first processor 21 transmits a key authentication completion notice to the second Bluetooth unit 34 through the first Bluetooth unit 23. The second processor 31 then controls the touch display module 35 to display the key authentication completion notice and allows the mobile device 30 to connect with the vehicular computer 20 for the user to control the vehicle through operation of the application. When the authentication is not successful, the vehicular computer 20 then transmits a key authentication error notice to the mobile device 30 and the key authentication error notice is displayed on the touch display module 35 for user's awareness, thus preventing the mobile device 30 from connecting to a vehicular computer 20 unpaired with the mobile device 30, reducing an error rate of unsuccessful connection, and attaining a second protection scheme for secure connection. The first Bluetooth key and the second Bluetooth key may be symmetric keys. Under the circumstance, the successful authentication for the first Bluetooth key and the second Bluetooth key means that the first Bluetooth key is identical to the second Bluetooth key. Alternatively, the first Bluetooth key and the second Bluetooth key may be asymmetric keys. Under the circumstance, the successful authentication for the first Bluetooth key and the second Bluetooth key means that the first Bluetooth key and the second Bluetooth key are paired with each other.

Figure 6:
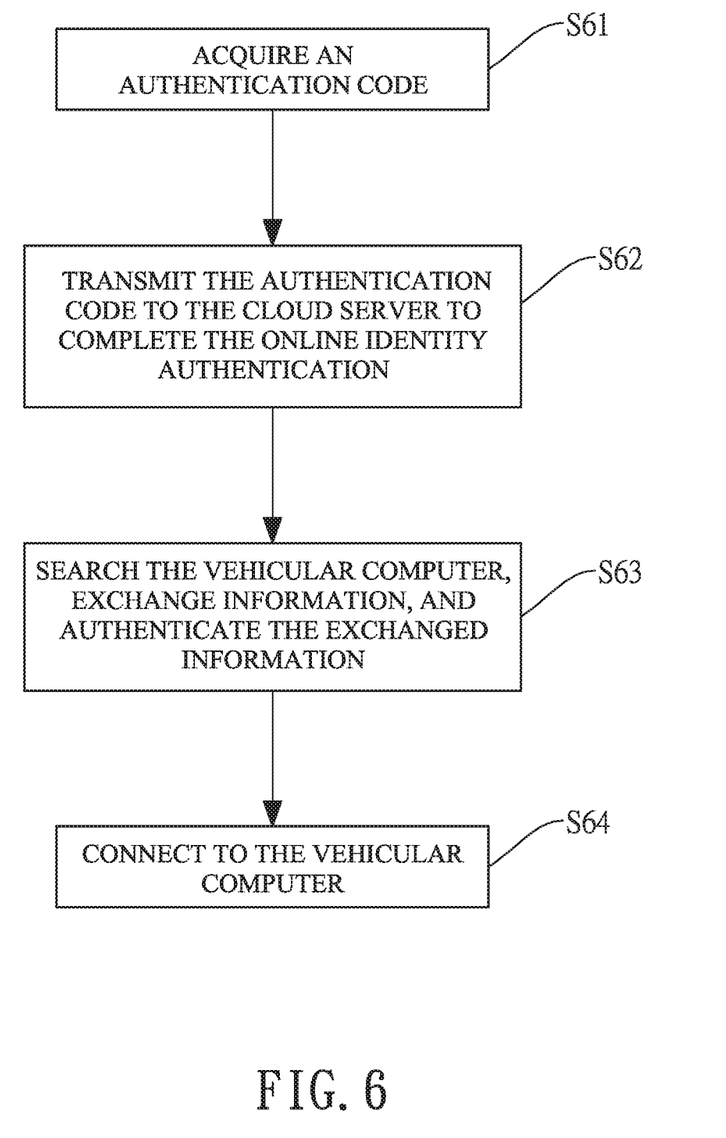
FIG. 6 is a first flow diagram showing a connection method in accordance with the present invention.

Based on the foregoing description, a connection method using the IoV system can be further derived. With reference to FIG. 6, the mobile device 30 is connected to the cloud server 10 at the remote end and the vehicular computer 20 at the local end. The connection method is performed by the IoV system and includes the following steps.

Step S61: The mobile device 30 acquires the authentication code.

Step S62: The mobile device 30 transmits the authentication code to the cloud server 10 at the remote end to complete the online identity authentication.

Step S63: The mobile device 30 searches the vehicular computer 20 at the local end through the Bluetooth connection, exchanges information with the vehicular computer 20, and authenticates the exchanged information.

Step S64: The mobile device 30 connects to the vehicular computer 20.

Figure 7:
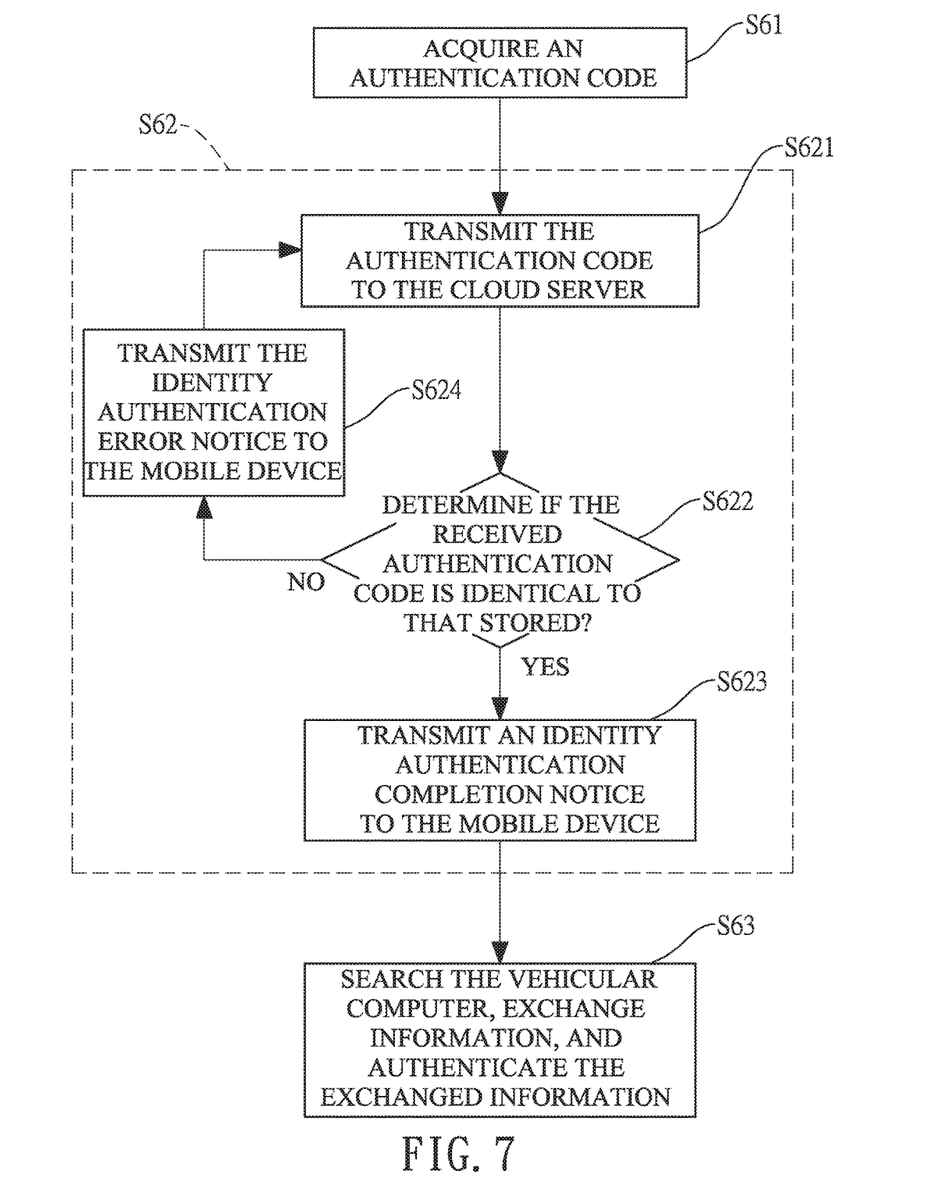
FIG. 7 is a second flow diagram showing a connection method in accordance with the present invention.

With reference to FIG. 7, the step S62 further includes the following steps.

Step S621: The mobile device 30 transmits the authentication code to the cloud server 10 at the remote end.

Step S622: The cloud server 10 compares if the authentication code is identical to that stored therein. If the comparison result is positive, perform step S623. Otherwise, perform step S624.

Step S623: The cloud server 10 transmits the identity authentication completion notice to the mobile device 30.

Step S624: The cloud server 10 transmits the identity authentication error notice to the mobile device 30 and resumes the step S621.

Figure 8:
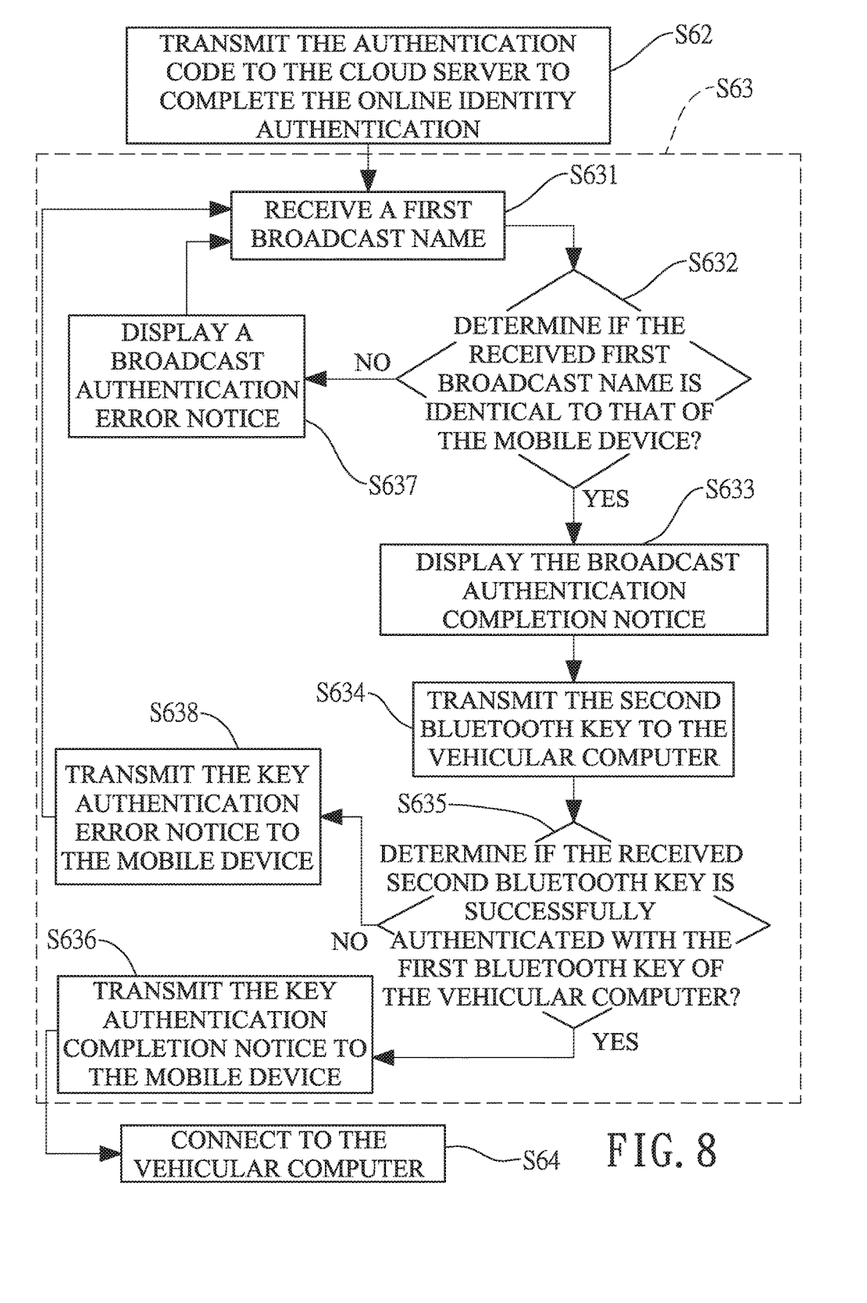
FIG. 8 is a third flow diagram showing a connection method in accordance with the present invention.

With reference to FIG. 8, the step S63 further includes the following steps.

Step S631: The mobile device 30 receives the first broadcast name of the vehicular computer 20.

Step S632: The mobile device 30 determines if the received first broadcast name is identical to the second broadcast name of the mobile device. If the determination result is positive, perform step S633. Otherwise, perform step S637 and then resume the step S631.

Step S633: The mobile device 30 displays the broadcast authentication completion notice for user's awareness.

Step S634: The mobile device 30 transmits the second Bluetooth key to the vehicular computer 20.

Step S635: The vehicular computer 20 determines if the received second Bluetooth key is successfully authenticated with the first Bluetooth key thereof. If the determination result is positive, perform step S636 and then resume the step S64. Otherwise, perform step S638 and then resume step S631.

Step S636: The vehicular computer 20 transmits the key authentication completion notice to the mobile device 30 for user's awareness.

Step S637: The mobile device 30 displays the broadcast authentication error notice for user's awareness.

Step S638: The vehicular computer 20 transmits the key authentication error notice to the mobile device 30 for user's awareness.

In sum, the present invention includes the following features:

1. By inputting the identity information in exchange of the authentication code, every time when the mobile device 30 needs to establish connection with the vehicular computer 20, the mobile device 30 must carry out the online identity authentication through the cloud server 10 to authenticate the authentication code. Such authentication approach provides the first protection scheme for secure connection requiring that users necessarily acquire the privilege to operate the mobile device 30 to connect to the vehicular computer 20.

2. The vehicular computer 20 that is controllable to the mobile device 30 can be recognized through the broadcast name of the mobile device 30 and the vehicular computer 20, thereby addressing the issue of erroneous connection or unauthorized connection and attaining the second protection scheme for secure connection.

3. The authentication for the Bluetooth keys in the mobile device 30 and the vehicular computer 20 can prevent the chance of unauthorized connection arising from the negligence of not taking inconsistency between the Bluetooth keys in the mobile device 30 and the vehicular computer into account and attains the second protection scheme for secure connection.

By virtue of the online identity authentication, information exchange, and authentication of exchanged information, the present invention achieves a multifold protection mechanism for secure connection, which effectively increases the protection effect for secure connection and against vehicle theft.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An Internet of vehicles (IoV) system performing connection authentication through a public network, comprising:
   a cloud server located at a remote end and storing and comparing data;
   a vehicular computer located at a local end, installed in a vehicle to control various types of electronic equipment of the vehicle, connected to the cloud server, and having a first broadcast name and a first Bluetooth key pre-stored therein acquired from the cloud server; and
   a mobile device connected to the cloud server and the vehicular computer and having a second broadcast name and a second Bluetooth key acquired from the cloud server;
   wherein the mobile device acquires an authentication code and transmits the authentication code to the cloud server to complete an online identity authentication, searches the vehicular computer according to a Bluetooth protocol, transmits the second broadcast name and the second Bluetooth key to the vehicular computer in exchange of the first broadcast name and the first Bluetooth key in the vehicular computer transmitted from the vehicular computer, and after the vehicular computer successfully authenticates the exchanged second broadcast name and the exchanged second Bluetooth key with the first broadcast name and the first Bluetooth key transmitted from the mobile device, establishes connection with the vehicular computer;
   wherein the cloud server compares if the received authentication code is identical to a pre-stored authentication code, and transmits an identity authentication completion notice to the mobile device when the comparison result is positive;
   wherein when finding the vehicular computer, the mobile device receives the first broadcast name, and determines if the first broadcast name is identical to the second broadcast name, the mobile device displays a broadcast authentication completion notice when the first broadcast name is identical to the second broadcast name;
   wherein when successfully authenticating the first Bluetooth key according to the second Bluetooth key, the vehicular computer transmits a key authentication completion notice to the mobile device.

2. The IoV system as claimed in claim 1, wherein the cloud server includes multiple pieces of security data, wherein each piece of security data includes a first broadcast name, a first Bluetooth key, a second broadcast name, a second Bluetooth key, an authentication code, and identity information; and
   the cloud server transmits the first broadcast name and the first Bluetooth key of one piece of the multiple pieces of security data to the vehicular computer according to a configuration notice transmitted from the vehicular computer so as to pre-store the first broadcast name and the first Bluetooth key in the vehicular computer.

3. The IoV system as claimed in claim 2, wherein the cloud server identifies any one piece of the multiple pieces of security data containing the identity information identical to identity information transmitted from the mobile device so as to pre-store the second broadcast name and the second Bluetooth key in the mobile device; and
   the cloud server transmits the authentication code, the second broadcast name and the second Bluetooth key of the piece of security data having the identity information identical to the identity information transmitted from the cloud server to the mobile device.

4. The IoV system as claimed in claim 1, wherein the cloud server identifies any one piece of the multiple pieces of security data containing the identity information identical to identity information transmitted from the mobile device so as to pre-store the second broadcast name and the second Bluetooth key in the mobile device; and
   the cloud server transmits the authentication code, the second broadcast name and the second Bluetooth key of the piece of security data having the identity information identical to the identity information transmitted from the cloud server to the mobile device.

5. A connection method performing connection authentication through a public network performed by an Internet of vehicles (IoV) system with a mobile device connected to a cloud server at a remote end and a vehicular computer at a local end, the connection method comprising steps of:
   acquiring an authentication code through the mobile device;
   transmitting the authentication code to the cloud server through the mobile device to complete an online identity authentication;
   searching the vehicular computer, exchanging information of a second broadcast name and a second Bluetooth key obtained from the cloud server with information of a first broadcast name and a first Bluetooth key that the vehicular computer acquires from the cloud server with the vehicular computer, and authenticating the exchanged information through the mobile device; and establishing connection with the vehicular computer through the mobile device;

wherein the cloud server includes multiple pieces of security data, wherein each piece of security data includes the first broadcast name, the first Bluetooth key, the second broadcast name, the second Bluetooth key, the authentication code, and identity information;

wherein the cloud server transmits the first broadcast name and the first Bluetooth key of one piece of the multiple pieces of security data to the vehicular computer according to a configuration notice transmitted from the vehicular computer;

wherein the cloud server identifies any one piece of the multiple pieces of security data containing the identity information identical to identity information transmitted from the mobile device; and the cloud server transmits the authentication code, the second broadcast name and the second Bluetooth key of the piece of security data having the identity information identical to the identity information transmitted from the cloud server to the mobile device for the mobile device for display and storage;

wherein the step of transmitting the authentication code to the cloud server comprises steps of:

transmitting the authentication code to the cloud server through the mobile device;

comparing if the authentication code is identical to an authentication code stored in the cloud server by the cloud server;

when the comparison result is positive, transmitting an identity authentication completion notice to the mobile device by the cloud server; and when the comparison result is negative, transmitting the identity authentication error notice to the mobile device by the cloud server and resuming the step of transmitting the authentication code to the cloud server;

wherein the vehicular computer has a first broadcast name and a first Bluetooth key pre-stored therein, the mobile device has a second broadcast name and a second Bluetooth key pre-stored therein, and the step of searching the vehicular computer further comprises steps of:

receiving the first broadcast name of the vehicular computer through the mobile device;

determining if the received first broadcast name is identical to the second broadcast name of the mobile device by the mobile device;

when the determination result is positive, displaying a broadcast authentication completion notice and transmitting the second Bluetooth key to the vehicular computer through the mobile device;

determining if the second Bluetooth key is successfully authenticated with the received first Bluetooth key by the vehicular computer; and when the determination result is positive, transmitting a key authentication completion notice to the mobile device through the vehicular computer.

\* \* \* \* \*